US012789302B2

(12) United States Patent
Costa de Souza et al.

(10) Patent No.: US 12,789,302 B2
(45) Date of Patent: Nov. 10, 2026

(54) TURNING DEVICE, METHOD OF ASSEMBLING THE TURNING DEVICE AND METHOD FOR ROTATION OF THE TURNING DEVICE

(71) Applicant: PETRÓLEO BRASILEIRO S.A.—PETROBRAS, Rio de Janeiro (BR)

(72) Inventors: Samuell Costa de Souza, Macaé (BR); Joao Paulo Urbano, Macaé (BR)

(73) Assignee: PETRÓLEO BRASILEIRO S.A.—PETROBRAS, Rio de Janiero (BR)

( * ) Notice: Subject to any disclaimer, the term of this patent is extended or adjusted under 35 U.S.C. 154(b) by 0 days.

(21) Appl. No.: 19/275,459

(22) Filed: Jul. 21, 2025

(65) Prior Publication Data

US 2026/0061535 A1 Mar. 5, 2026

(30) Foreign Application Priority Data

Aug. 29, 2024 (BR) .......................... 1020240177525

(51) Int. Cl.
*B23Q 1/25* (2006.01)

(52) U.S. Cl.
CPC ..................................... *B23Q 1/25* (2013.01)

(58) Field of Classification Search
CPC .............................. B23Q 16/06; B23Q 16/043
See application file for complete search history.

(56) References Cited

U.S. PATENT DOCUMENTS 3,643,292 A * 2/1972 Mayer .................... A47C 1/026 16/325
4,201,326 A * 5/1980 Connell ................. B23K 9/035 219/160
4,543,006 A * 9/1985 Wang ........................ E06C 1/32 16/334
5,689,994 A * 11/1997 Nagai ...................... B23Q 5/38 74/89.32

(Continued)

FOREIGN PATENT DOCUMENTS

EP 0911716 B1 1/2004

*Primary Examiner* — Vicky A Johnson
(74) *Attorney, Agent, or Firm* — McCarter & English, LLP

(57) ABSTRACT

A device capable of connecting different tool sections, with the purpose of promoting the rotation between the same (angular movement) and, thus, allowing the tool to fulfill its function, overcoming access difficulties arising from the limitations of an ROV manipulator or human arm, for example, is disclosed. For this purpose, a turning device is disclosed, which comprises: two side covers; two side guides; a "T" joint; an internal structure; a "V" joint; at least three pins; at least two bushings; and a central shaft; in which the central shaft internally connects the two side covers in a fixed manner; in which the internal structure comprises at least three holes, through which the at least three pins pass from the external surface to the internal surface of the device; in which the at least three pins comprise in each pin a screw and a spring; and wherein the central shaft presents a circular geometry with at least eight depressions. The disclosure also describes a method of assembling the turning device and a method for rotation of the turning device.

14 Claims, 6 Drawing Sheets

(56) References Cited

U.S. PATENT DOCUMENTS

| | | | | |
|---|---|---|---|---|
| 6,386,421 | B1 * | 5/2002 | Anderson .......... | B23K 37/0531<br>228/44.5 |
| 7,856,971 | B2 * | 12/2010 | Amaral ............... | A47J 37/0704<br>312/410 |

* cited by examiner

TURNING DEVICE, METHOD OF ASSEMBLING THE TURNING DEVICE AND METHOD FOR ROTATION OF THE TURNING DEVICE

CROSS-REFERENCE TO RELATED APPLICATIONS

This application claims priority to Brazilian Application No. BR1020240177525 filed on Aug. 29, 2024, the disclosure of which is expressly incorporated herein by reference in its entirety.

FIELD OF THE INVENTION

The present invention falls within the field of technologies related to pivoting connections, engineering rotating elements, and arrangements for device locking. More specifically, the present invention is applied in the field of tool joints and connections and, more particularly, it refers to an angular turning device to be coupled between two tool sections.

BACKGROUND OF THE INVENTION

The difficulty of handling different tools is a reality that many professionals face, especially when it comes to accessing difficult areas, so that professionals are often forced to improvise and use ineffective methods to circumvent this issue, which can result in delays, wasted time and even accidents.

The lack of a specific device to facilitate a movement between different tool sections also has a direct impact on productivity and the quality of the work performed, since professionals who depend on precision and agility in their tasks face constant obstacles when dealing with this limitation. In addition, the lack of accessibility to hard-to-reach areas can compromise the proper maintenance of equipment and structures, increasing the operating costs and the risk of failure or damage.

An example of the situation described is the use of Remotely Operated Vehicles (ROVs), which are implements widely used to perform underwater inspection and maintenance operations, and which have two manipulators (mechanical arms), each with a gripper at the end to hold or manipulate equipment and tools.

Due to the limited size and degrees of freedom of the ROV manipulator, since such manipulators have features to meet the general operations, it is not possible to access places with a certain degree of difficulty of access, such as certain cases that occur, for example, in underwater installations containing many pipelines close to each other, in regions covered by pipes (such as, for example, to measure the thickness of a pipe in an opposite generatrix), among others. For such situations, dedicated tools would be necessary, with a profile designed specifically for each application.

Accordingly, there is a need in the state of the art for the development of devices capable of connecting different tool sections, in order to promote a rotation between the same (angular movement) and, thus, allow the tool to fulfill its function, overcoming access difficulties arising from the limitations of an ROV manipulator or human arm, for example.

RELATED ART

The search for the history led to some documents that disclose matters within the technological field of the present invention.

Document U.S. Pat. No. 4,543,006 A discloses improvements to a multi-position folding ladder joint, in which one side of the locking disc of the second joint member is provided between each notch thereof, and the common axial bolt with cams capable of unidirectional rotation under the actuation action of the operating lever release element. Document U.S. Pat. No. 4,543,006 A further discloses a pivoting system applied to ladders. This system allows two distinct portions to pivot/be folded around a central shaft, placing the ladder in multiple positions.

Document U.S. Pat. No. 3,643,292 A discloses a locking hinge that is generally part of folding ladders, reclining chairs, etc., in which a pair of hinge arms are connected to each other, pivoting around a common axis.

Document EP 0 911 716 B1 discloses an angular positioning and retaining device especially for a windshield wiper lever of a vehicle switch control unit, which is provided with a cam body defining a plurality of seats, and a retaining element which can be coupled to the windshield wiper lever, which can be rotated about a pivot axis to selectively engage the seats; at least one of the cam body and the retaining element being provided with at least one resilient portion yieldable during the rotation of the retaining element about the pivot axis.

However, none of the documents U.S. Pat. Nos. 4,543,006 A, 3,643,292 A and EP 0 911 716 B1 of the state of the art describe an angular turning device for access to remote locations, including via ROV, capable of providing different angular positions by means of an independent rotation of its parts, capable of load adjustment by tightening screws and further capable of providing a system connecting several tool sections (by means of T and V joints), which can even be connected to the external portion of one of the covers of the external part of the device, as the present invention describes.

SUMMARY OF THE INVENTION

The present invention develops a device capable of connecting different tool sections, with the purpose of promoting the rotation between the same (angular movement) and, thus, allowing the tool to fulfill its function, overcoming access difficulties arising from the limitations of an ROV manipulator or human arm, for example. For this purpose, the present invention comprises a turning device, which comprises: two side covers; two side guides; a “T” joint; an internal structure; a “V” joint; at least three pins; at least two bushings; and a central shaft; in which the central shaft internally connects the two side covers in a fixed manner; in which the internal structure comprises at least three holes, through which the at least three pins pass from the external surface to the internal surface of the device; in which the at least three pins comprise a screw and a spring in each pin; and in which the central shaft presents a circular geometry with a plurality of depressions.

There is described a device in which the two side covers are laterally opposed to each other, and in which the internal structure is arranged in the middle of the two side covers, wherein the internal structure is movable in relation to the two side covers. The two side guides are fixed to the two side covers, in which each side guide is fixed to one of the two side covers. One of the side guides further presents an opening in its upper part. The “T” joint is fitted into the two side guides through this opening in one of the two side guides, so that it connects the two side covers. The “T” joint has threaded ends, in which the “T” joint is fixed to the two side guides by means of two nuts. The "V" joint is fixed to the surface of the internal structure.

The device further describes that each side cover comprises at least two bushings, and in which the bushings are mounted in internal cavities of the two side covers. The central shaft is fixed in the bushing cavities. The spring is housed in the rear part of the pin, and the screw is fixed in the rear part of the pin and on top of the spring. The "T" joint comprises an upper surface, and the "V" joint also comprises an upper surface.

The present invention also describes a method of assembling the turning device that comprises the following steps: mounting a side cover on one side of the internal structure, and positioning a bushing in the space between the side cover and the internal structure; mounting the central shaft, and positioning the central shaft in the bushing hole; positioning a bushing on the central shaft, and mounting a side cover on another side of the internal structure; assembling the at least three springs on the at least three pins, and housing the at least three pins in the at least three holes located in the internal structure; tightening the screws of the at least three pins, and positioning the at least three pins in at least three depressions of the plurality of depressions; and fixing the two side guides on the side covers, and positioning the "T" joint in the side guides through the nuts. In this way, after performing the steps, there is the test of the force applied to the "T" joint and the "V" joint.

The present invention further describes a method for rotation of the turning device that comprises the following steps: loosening the screws of the at least three pins; rotating the structure composed of the two side covers in relation to the internal structure; tightening the screws of the at least three pins, and positioning the at least three pins in at least three depressions of the plurality of depressions.

BRIEF DESCRIPTION OF THE DRAWINGS

In order to obtain a complete and total view of the object of this invention, the figures to which reference is made are presented, as follows.

DETAILED DESCRIPTION OF THE INVENTION

Figure 1:
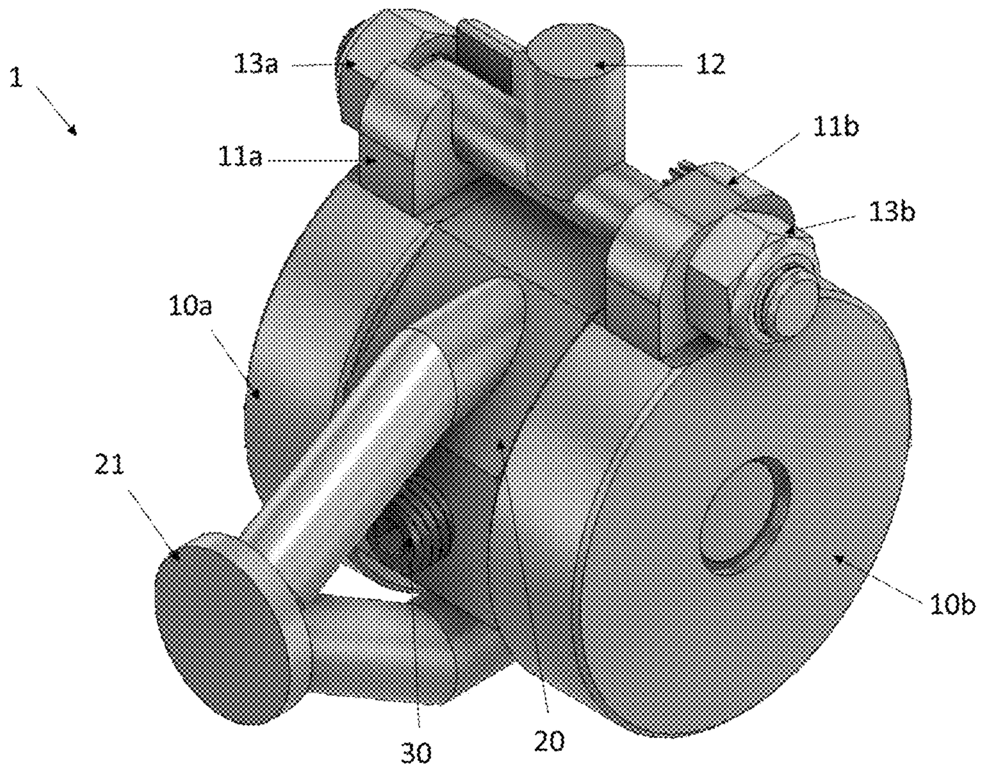
FIG. 1 shows a perspective view of the turning device, according to the present invention.

Below, reference is made in detail to the preferred embodiments of the present invention illustrated in the attached drawings. Whenever possible, the same or similar reference numerals will be used throughout the drawings to refer to the same or similar features. It should be noted, however, that the drawings are in simplified form and are not represented to a precise scale, so that small variations are expected.

Initially, it should be noted that the terms "turning" and "rotation" and others, as used throughout the text of the present invention, should not be interpreted in a specific or limiting manner, but rather in a general manner, and are often used as synonyms to refer to the movement of the device of the present invention.

In order to enable the use of tools in spaces that are difficult to access, the present invention was developed. In this way, the solution of the invention consists of a device for turning a tool between two or more tool sections, such as the head and handle, and thus allowing the tool to access more difficult to reach or more restricted locations.

To this end, the invention consists of a turning device (1) comprising: two side covers (10*a*, 10*b*); two side guides (11*a*, 11*b*); a "T" joint (12); an internal structure (20); a "V" joint (21); at least three pins (30); at least two bushings (40*a*, 40*b*); and a central shaft (50).

As illustrated in FIG. 1, the two side covers (10*a*, 10*b*) are laterally opposite to each other, and in which the internal structure (20) is arranged in the middle of the two side covers (10*a*, 10*b*), so that the internal structure (20) is movable in relation to the two side covers (10*a*, 10*b*).

The two side guides (11*a*, 11*b*) are fixed to the two side covers (10*a*, 10*b*), in which the side guide (11*a*) is fixed to the side cover (10*a*) and the side guide (11*b*) is fixed to the side cover (10*b*), as illustrated in FIG. 1. The side guide (11*a*) further presents an opening in its upper part, so that it allows the fitting of the "T" joint (12).

The "T" joint (12) is fitted into the two side guides (11*a*, 11*b*) through the opening of the side guide (11*a*), so that it connects the two side covers (10*a*, 10*b*), making them connected to each other. This causes the two side covers (10*a*, 10*b*) to move together, presenting the same freedom of rotation.

In addition, the "T" joint (12) has threaded ends, so that the "T" joint (12) is fixed to the two side guides (11*a*, 11*b*) by means of two nuts (13*a*, 13*b*).

As further illustrated in FIG. 1, the "V" joint (21) is fixed to the surface of the internal structure (20), in which the fixing of the "V" joint (21) to the surface of the internal structure (20) can preferably be done by means of welded joints.

Figure 2:
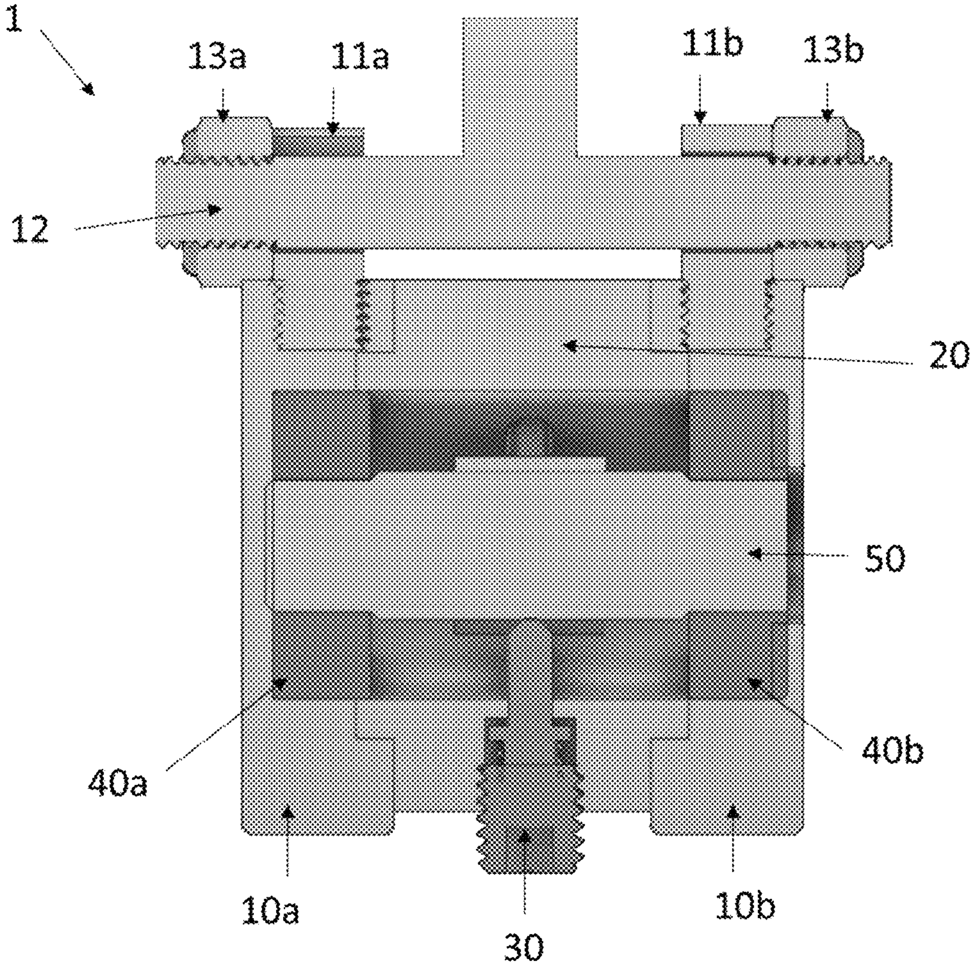
FIG. 2 shows a front section of the turning device, according to the present invention.

As illustrated in FIG. 2, where there can be seen a front section of the turning device (1), each side cover (10*a*, 10*b*) comprises the at least two bushings (40*a*, 40*b*), in which the bushings (40*a*, 40*b*) are mounted in internal cavities of the two side covers (10*a*, 10*b*).

As further illustrated in FIG. 2, the central shaft (50) is fixed in the cavities of the bushings (40*a*, 40*b*), and in which the central shaft (50) internally connects the two side covers (10*a*, 10*b*) in a fixed manner.

The central shaft (50) presents a circular geometry with a plurality of depressions. Preferably, the circular geometry presents at least three depressions, more preferably at least eight depressions, as can be noted in FIG. 3. The respective depressions of the plurality of depressions are responsible for coupling the at least three pins (30).

When coupling the at least three pins (30) to at least three depressions of the plurality of depressions, the device (1) will be locked, so as to maintain the position in which it was placed.

In order to move the device (1), which is its rotation, it is necessary to apply a tangential force to the structure composed of the two side covers (10*a*, 10*b*) and to the internal structure (20), so that they rotate among themselves, and, during the rotation, the at least three pins (30) rotate around the central shaft (50). After the rotation, it is possible to position the at least three pins (30) in the at least three desired depressions of the plurality of depressions.

The depressions of the plurality of depressions represent different possible angular positions for positioning the structure composed of the two side covers (10*a*, 10*b*) in reference to the internal structure (20), Preferably eight different angular positions, that is, every 45 degrees. However, the device of the present invention is not limited to only eight depressions, and it may be possible to adapt the same according to the needs of the project.

Figure 3:
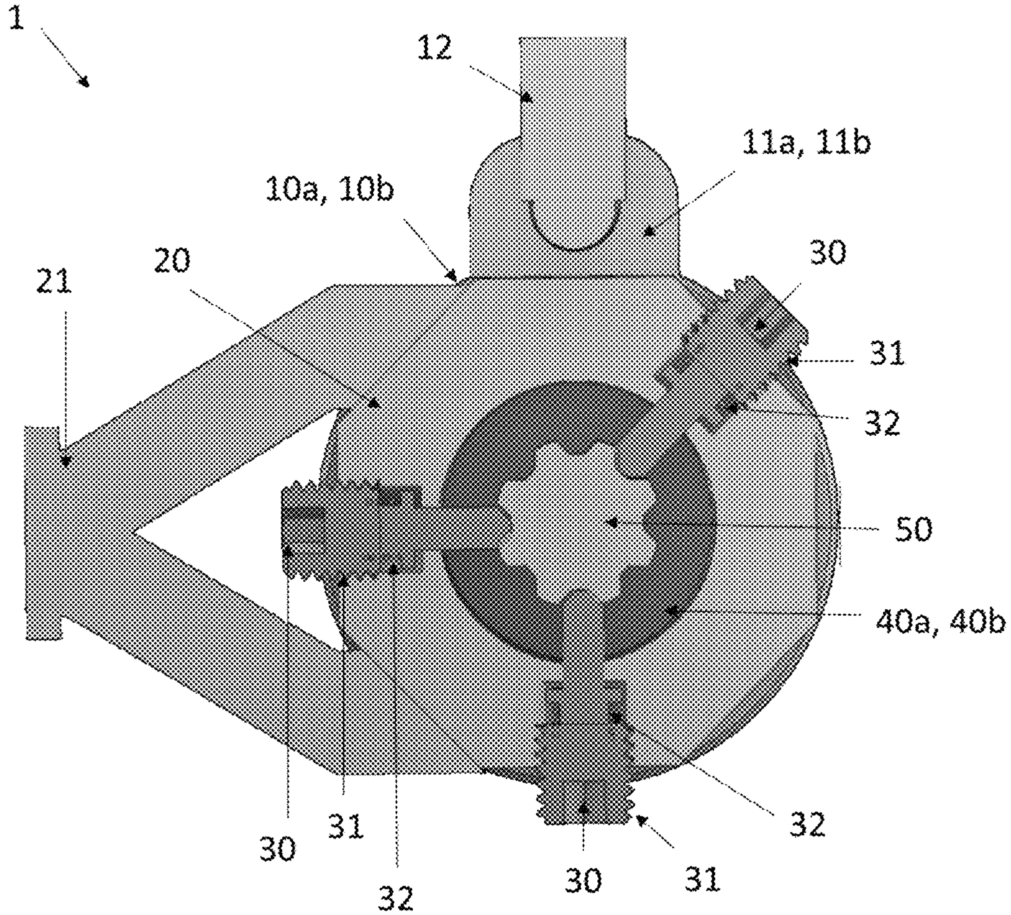
FIG. 3 shows a side section of the turning device, according to the present invention.

As illustrated in FIG. 3, where it is possible to see a side section of the turning device (1), the internal structure (20) comprises at least three holes, through which the at least three pins (30) pass from the external surface to the internal surface of the device (1).

As further illustrated in FIG. 3, the at least three pins (30) comprise in each pin (30) a screw (31) and a spring (32), in which the spring (32) is housed in the rear part of the pin (30). The screw (31) is fixed to the rear part of the pin (30) and on top of the spring (32), and in which the screw (31) is responsible for tightening the spring (32), in order to apply the compression force to the respective pin (30) capable of keeping the pin (30) in the desired position, in the respective depression of the plurality of depressions.

Figure 4:
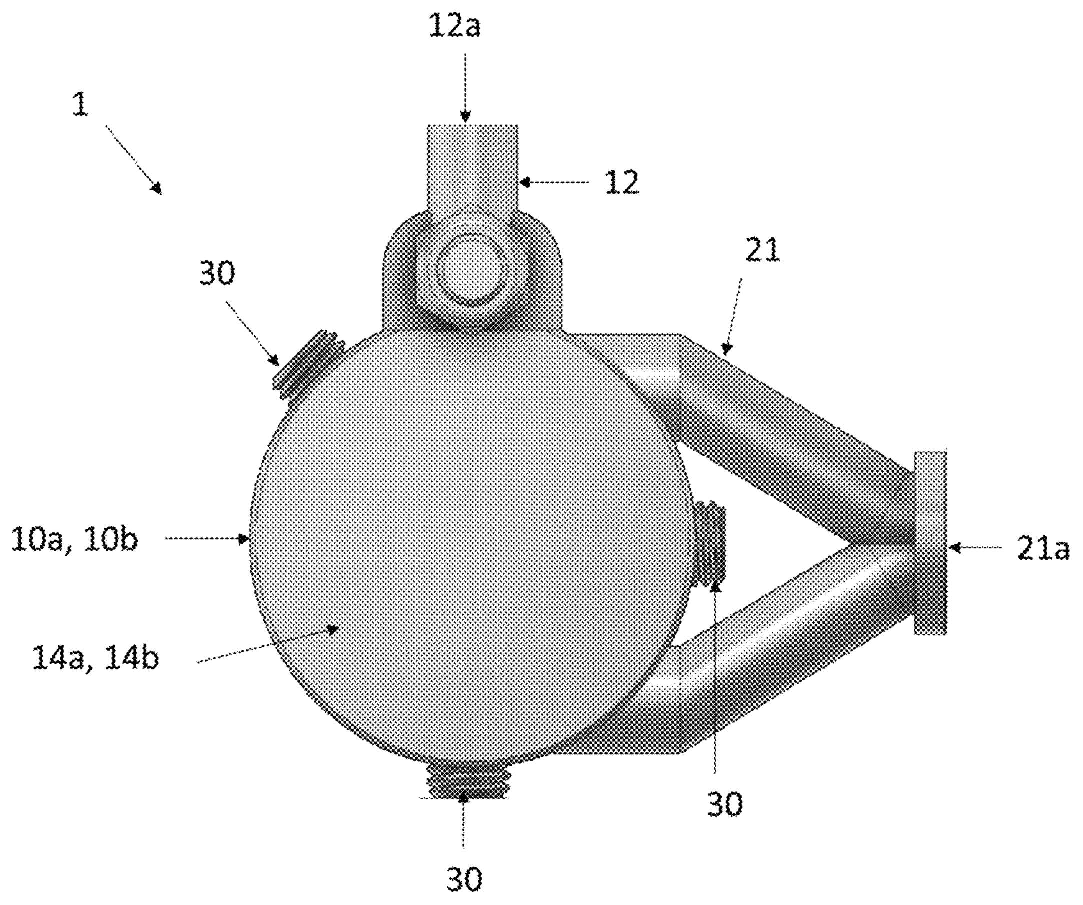
FIG. 4 shows a side view of the turning device, according to the present invention.
Figure 5:
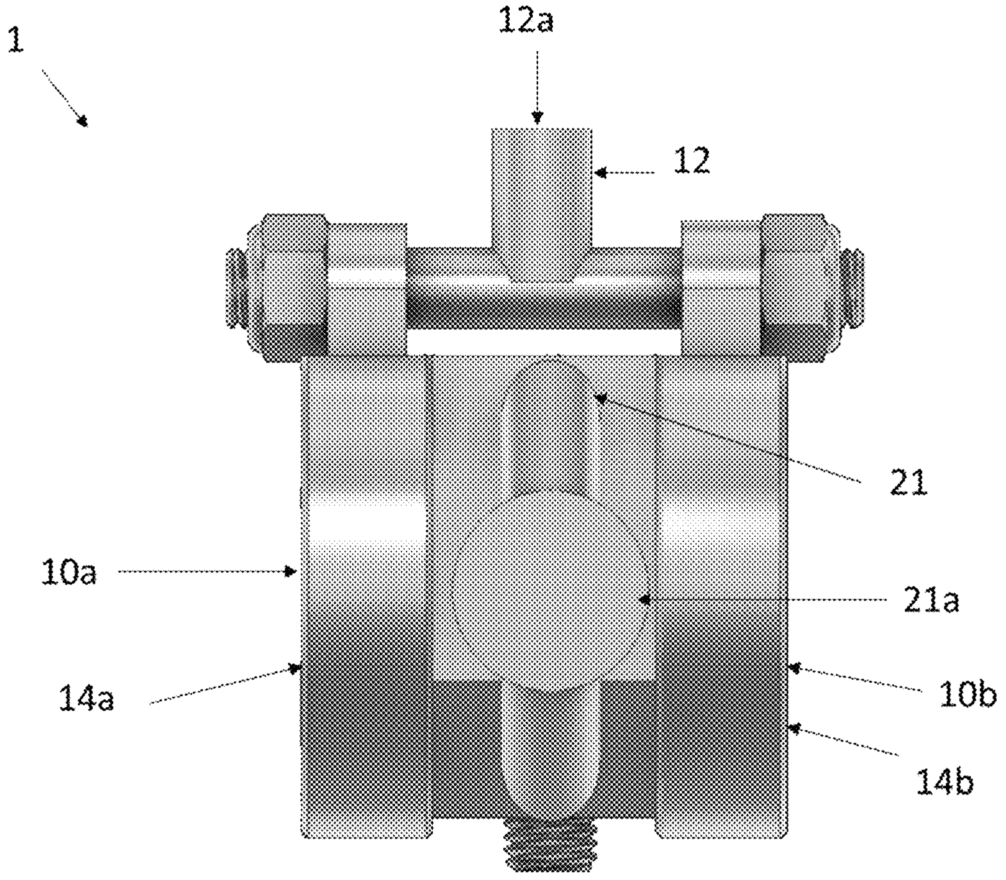
FIG. 5 shows a front view of the turning device, according to the present invention.
Figure 6:
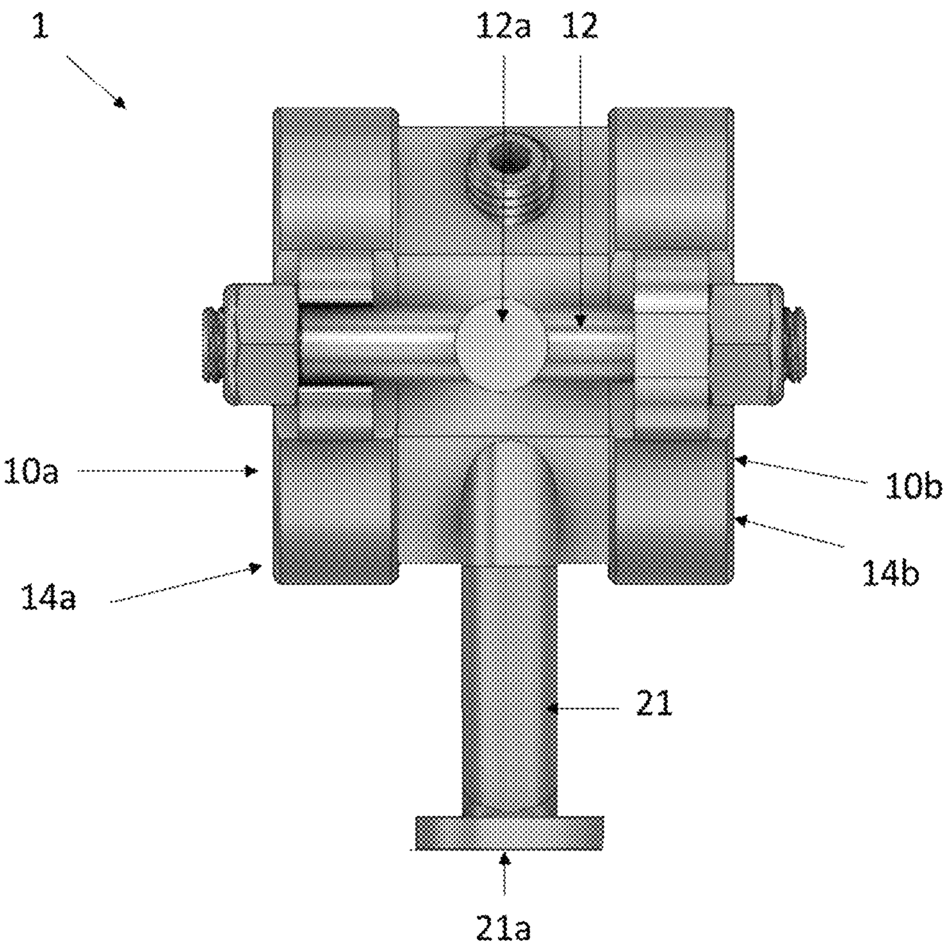
FIG. 6 shows a top view of the turning device, according to the present invention.

As illustrated in FIGS. 4, 5 and 6, it is possible to visualize the “T” joint (12) and the “V” joint (21); in which the “T” joint (12) comprises an upper surface (12*a*), which is responsible for being the surface (12*a*) where a part of a tool is positioned and fixed; in which the “V” joint (21) comprises an upper surface (21*a*), which is responsible for being the surface (21*a*) where a part of a tool is positioned and fixed.

In a non-limiting manner, tools and utilities can be fixed and positioned on the external surfaces (14*a*, 14*b*) of the two side covers (10*a*, 10*b*).

The present invention also describes a method of assembling the turning device (1), which comprises the following steps:

The first step comprises mounting a side cover (10*a*) on one side of the internal structure (20), and positioning a bushing (40*a*) in the space between the side cover (10*a*) and the internal structure (20).

The second step comprises assembling the central shaft (50), and positioning the central shaft (50) in the hole of the bushing (40*a*).

The third step comprises positioning a bushing (40*b*) on the central shaft (50), and mounting a side cover (10*b*) on another side of the internal structure (20).

The fourth step comprises assembling the three springs (32) on the at least three pins (30), and housing the at least three pins (30) in the three holes located in the internal structure (20).

The fifth step comprises tightening the screws (31) of the at least three pins (30), in order to position the at least three pins (30) in at least three depressions of the plurality of depressions.

The sixth and final step comprises fixing the two side guides (11*a*, 11*b*) to the side covers (10*a*, 10*b*), and positioning the “T” joint (12) in the side guides by means of the nuts (13*a*, 13*b*).

After performing the steps of the method of assembly of the turning device (1), the force applied to the “T” joint (12) and the “V” joint (21) for the angular displacement must be tested; if an excessive looseness or tightness is detected, the required looseness is to be adjusted, respectively, by tightening or loosening the screws (31) of at least three pins (30).

The present invention further describes a method for rotating the turning device (1), which comprises the following steps:

The first step comprises loosening the screws (31) of at least three pins (30), enabling a lower compression force on the spring (32), and ensuring that the at least three pins (30) are not positioned in at least three depressions of the plurality of depressions.

The second step comprises rotating the structure composed of the two side covers (10*a*, 10*b*) in relation to the internal structure (20).

The third and final step comprises tightening the screws (31) of the at least three pins (30), in order to position the at least three pins (30) in at least three depressions of the plurality of depressions. In this way, the device (1) of the present invention is fixed in the desired positioning and angle for the operation.

Accordingly, the device of the present invention develops a device capable of connecting different tool sections, in order to promote the rotation between the same (angular movement) and, thus, allow the tool to fulfill its function, overcoming access difficulties arising from the limitations of an ROV manipulator or human arm, for example.

The invention is preferably applied to underwater tools handled by an ROV; however, it is not limited to this application, since the device can be connected to other types of tools (adapted for this purpose) outside the maritime environment and handled by robots or people.

Those skilled in the art will appreciate the knowledge presented herein and will be able to reproduce the invention in the presented embodiments and in other variants, encompassed by the scope of the attached claims.

What is claimed is:

1. A turning device comprising:

two side covers;

two side guides;

a “T” joint;

an internal structure having;

a “V” joint;

at least three pins;

at least two bushings; and a central shaft which internally connects the two side covers in a fixed manner;

the internal structure comprising at least three holes, through which the at least three pins pass from an external surface to an internal surface of the device;

each of the at least three pins each comprise a screw and a spring; and the central shaft presenting a circular geometry with a plurality of depressions.

2. The turning device according to claim 1, wherein the two side covers are laterally opposed to each other, and in which the internal structure is arranged in the middle of the two side covers, in which the internal structure is movable in relation to the two side covers.

3. The turning device according to claim 2, wherein the two side guides are fixed to the two side covers, in which the side guide is fixed to the side cover and the side guide is fixed to the side cover.

4. The turning device according to claim 3, wherein the side guides further have openings in upper parts of the guides.

5. The turning device according to claim 4, wherein the “T” joint is fitted into the two side guides through the openings of the side guide, so as to connect the two side covers.

6. The turning device according to claim 5, wherein the “T” joint has threaded ends and the “T” joint is fixed to the two side guides by two nuts.

7. The turning device according to claim 1, wherein the "V" joint is fixed to a surface of the internal structure.

8. The turning device according to claim 1, wherein each side cover comprises at least two bushings, and in which the bushings are mounted in internal cavities of the two side covers.

9. The turning device according to claim 1, wherein the central shaft is fixed in the cavities of the bushings.

10. The turning device according to claim 1, wherein the spring is housed in a rear part of the pin, and the screw is fixed in the rear part of the pin and on top of the spring.

11. The turning device according to claim 1, wherein the "T" joint comprises an upper surface, and the "V" joint comprises an upper surface.

12. A method of assembling the turning device, as defined in claim 11, comprising at least the steps of:

mounting a side cover on one side of the internal structure, and positioning a bushing in the space between the side cover and the internal structure;

mounting the central shaft, and positioning the central shaft in the bushing hole;

positioning a bushing on the central shaft, and mounting a side cover on another side of the internal structure;

assembling the at least three springs on the at least three pins, and housing the at least three pins in the at least three holes located in the internal structure;

tightening the screws of the at least three pins, and positioning the at least three pins in at least three depressions of the plurality of depressions; and fixing the two side guides to the side covers, and positioning the "T" joint in the side guides by means of the nuts.

13. The method according to claim 12, further comprising testing the force applied to the "T" joint and the "V" joint.

14. A method for rotation of the turning device, as defined in claim 11, comprising the steps of:

loosening the screws of the at least three pins;

rotating the structure composed of the two side covers in relation to the internal structure; and tightening the screws of the at least three pins, and positioning the at least three pins in at least three depressions of the plurality of depressions.

* * * * *